M. ZWILLINGER.
LENS.
APPLICATION FILED SEPT. 23, 1916.
1,236,895.
Patented Aug. 14, 1917.
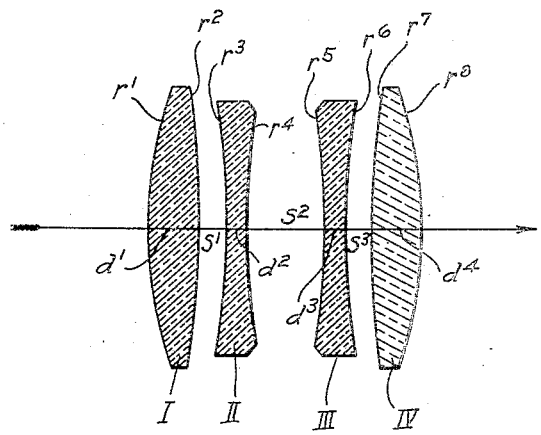
Inventor:
Max Zwillinger
by Davis & Simm
his attorneys

UNITED STATES PATENT OFFICE.

MAX ZWILLINGER, OF ROCHESTER, NEW YORK, ASSIGNOR TO CROWN OPTICAL COMPANY, OF ROCHESTER, NEW YORK, A CORPORATION.

LENS.

1,236,895.   Specification of Letters Patent.   Patented Aug. 14, 1917.

Application filed September 23, 1916. Serial No. 121,879.

*To all whom it may concern:*

Be it known that I, MAX ZWILLINGER, a citizen of the United States, and resident of Rochester, in the county of Monroe and State of New York, have invented certain new and useful Improvements in Lenses, of which the following is a specification.

This invention relates to lenses, and an object thereof is to render possible the construction of a photographic objective of shallow curves, fully corrected for chromatic and spherical aberration, distortion, astigmatism, and curvature of field, from common flint and crown glass, without the use of expensive barium crown glass heretofore required in high grade lenses of similar character.

To these and other ends, the invention consists of certain parts and combinations of parts, all of which will be hereinafter described, the novel features being pointed out in the appended claims.

The drawing herewith shows, more or less diagrammatically, a longitudinal section through a lens embodying the feature of this invention.

An attempt has been made by Zschokke & Urban (U. S. Patent #745,550, dated December 1, 1903) to eliminate the expensive and unreliable barium crown glass of high refractive index commonly used in such objectives, but calculations show that the correction as regards astigmatism for oblique pencils is not nearly so good in the aforesaid patent construction as in the ones employing barium crown glass, as for instance, the one shown in U. S. Patent #635,472 to Goerz & Hoegh. For instance, in said patented construction foc. EF=100 mm., an oblique ray at 18° secondary foci −1.11 mm., primary foci +1.41 mm.), and a ray at 24° (secondary foci −1.21 mm., primary foci +4.26 mm.) proves the presence of astigmatism which deteriorates the definition on the outer parts of the field. A comparison of the Zschokke & Urban objective with the very simple construction set forth in U. S. Patent #554,737 to Schroeder on February 18, 1896, and representing an achromatized periscope, shows that the definition is about equal and the loss of light and brilliancy caused by the addition of four reflecting surfaces as required by the Zschokke & Urban lens is not justified by better central definition or increased covering power.

According to this invention "old glasses" are employed and the Petzval condition fulfilled, the lens having four separated elements, numbered in the drawings I, II, III and IV, respectively, the first element being biconvex, the second and third being biconcave, and the fourth also being biconvex. The first and fourth elements are substantially of the same power and shape, the proportions of the radii being about as 1 to 2, that is, $r':r^2$ or $r^8:r^7$ as 1:2. The two central or intermediate biconcave elements are also preferably duplicates of each other. The elements I, II and III are made of dense flint glass, while the element IV is of common crown glass. Thus there are two similar negative elements both of the same kind of glass, and two other similar positive elements each of a different kind of glass. Lenses I, II, III are of glass of high refractive index and the fourth is of glass of low refractive index. The two outer elements are converging or collective, of the same power but of different kinds of glass, while the two inner elements are dispersive and are both of the same kind of glass, the refractive index of each glass being as expressed below.

Dense flint $n$D 1.61661 V=36.5.
Common crown $n$D 1.51748 V=58.4.

In the example given, the light is assumed to be coming from the left, as indicated in the drawing, and the conventional notations or characters as above mentioned are used, $r'$, $r^2$, etc., for the first, second, etc., radius, measured positively, when the surface is convex to the incident light; $d'$, $d^2$, etc., for the thickness of the first, second, etc., elements; $S'$, $S^2$, etc., for the air space or interval between the several elements.

$n$D refractive index for the "D line.

$n$G refractive index for the G' line.

V the dispersive reciprocal.

Data given for an equivalent focal length 100 m. and aperture ratio F/7.5.

$$\text{I}\begin{cases} r' = +23.246 \\ r^2 = -46.659 \end{cases}$$
$$d' = 2.4228$$
$$S' = 1.4370$$
$$\text{II}\begin{cases} r^3 = -29.520 \\ r^4 = +37.624 \end{cases}$$
$$d^2 = 0.9085$$
$$\text{Lens I II III from common dense flint.}$$
$$n\text{D } 1.61661$$
$$n\text{G}' 1.63895 \quad V = 36.5$$
$$S^2 = 4.0000$$
$$\text{III}\begin{cases} r^5 = -37.624 \\ r^6 = +29.520 \end{cases}$$
$$d^3 = 0.9085$$
$$S^3 = 1.4370$$
$$\text{Lens IV from common crown.}$$
$$n\text{D } 1.51748$$
$$n\text{G}' 1.52872 \quad V = 58.4$$
$$\text{IV}\begin{cases} r^7 = +41.000 \\ r^8 = -19.182 \end{cases}$$
$$d^4 = 2.4228$$

| | | $n$D | $n$G' |
|---|---|---|---|
| The back focal length of the front half | (BF=1—2).... | 156.35 | 147.75 |
| Equiv. foc. length " " " | (EF=1—2).... | 175.19 | 166.15 |
| Back " " " rear " | (BF=4—3).... | 157.09 | 165.53 |
| Equiv. foc. " " " " | (EF=4—3).... | 176.62 | 186.49 |
| Back foc. " " system | (BF=1—4).... | 93.74 | 93.62 |
| Equiv. foc. " " " | (EF=1—4).... | 100.— | 100.17 |

The above figures show that the front half is undercorrected for actinic rays and that the rear half is overcorrected to the same extent, so that in the whole system the two errors compensate each other and the visual image coincides with the actinic image.

The edge ray entering the system at the F/7.5 zone is 0.22 mm. overcorrected for spherical aberration and 0.26 mm. overcorrected for the sine condition. An oblique ray at 24° aiming at the corner of the photographic plate forms its secondary focus at —0.16 mm. and its primary focus at —0.80 mm. from the ideal focal plane. This proves that the system is free from astigmatism and has a flat field.

The example above cited shows only one solution or one particular combination. Obviously, lenses of other proportions (within certain limits) may be used, the essential feature being in the use of three common or dense flint lenses together with one of common crown glass to accomplish the desired results.

What I claim as my invention and desire to secure by Letters Patent is:—

1. A photographic objective consisting of four elements two of which are biconvex lenses, one made of common flint glass and the other made of common crown glass, and the other two of which are biconcave and made of common dense flint glass.

2. A photographic objective corrected for spherical and chromatic aberration, astigmatism, distortion, and flatness of field consisting of four single elements, the two outer being converging and substantially of the same power and of different glass and the two inner being dispersive and of the same glass.

3. A photographic objective corrected for spherical and chromatic aberration, astigmatism, distortion and flatness of field consisting of four single elements separated by air spaces, the two outer being converging and substantially the same in power and shape but one being made of common dense flint glass and the other being made of common crown glass, and the two intermediate elements being dispersive and substantially the same in power and shape and being made of common dense flint glass.

MAX ZWILLINGER.